(No Model.)
P. KEILT.
PIPE CONNECTION.
No. 264,706. Patented Sept. 19, 1882.
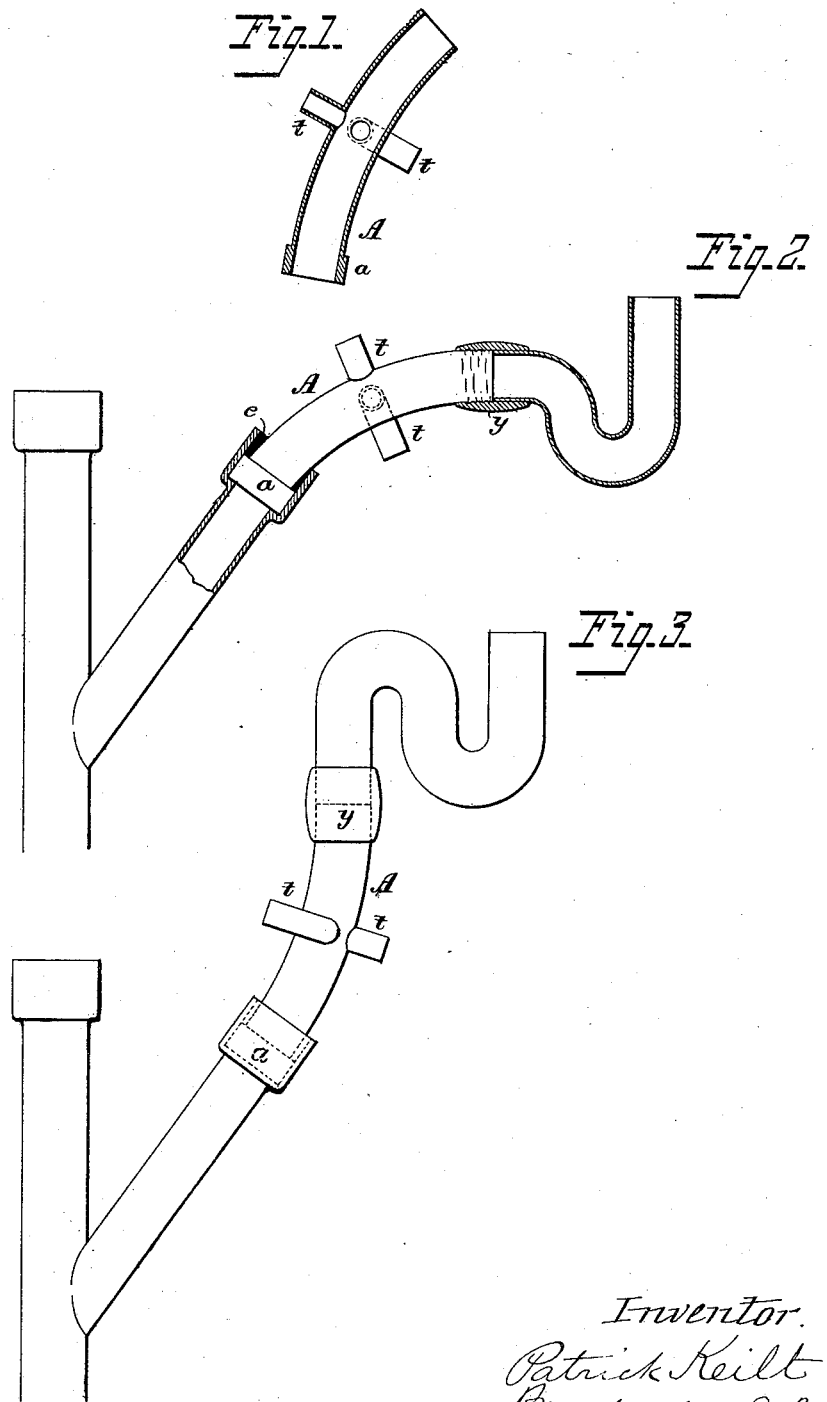
Inventor.
Patrick Keilt
By Charles E. Foster
his attorney
Attest:
Courtney A. Cooper
H. E. Hansmann.

UNITED STATES PATENT OFFICE.

PATRICK KEILT, OF BROOKLYN, NEW YORK.

PIPE-CONNECTION.

SPECIFICATION forming part of Letters Patent No. 264,706, dated September 19, 1882.

Application filed June 28, 1882. (No model.)

*To all whom it may concern:*

Be it known that I, PATRICK KEILT, of Brooklyn, Kings county, New York, have invented certain Improvements in Pipe-Connections, of which the following is a specification.

My invention is a connection for uniting pipes of hard and soft metal, constructed as fully described hereinafter, so as to effect the requisite union with but few joints, the same connection being available for uniting pipes of different shapes and for facilitating connection with laterals.

In the drawings, Figure 1 is a sectional view, showing my improved pipe-connection. Fig. 2 is a view, partly in section, illustrating the connection uniting a Y-branch and P-trap; and Fig. 3 is a view showing the connection uniting a Y-branch and S-trap.

Heretofore in connecting traps or other soft-metal pipes or attachments to hard-metal pipes it has been common to use cylindrical brass thimbles embedded in the bell-mouth of the hard-metal pipe, and a curved soft-metal section is soldered to the thimble and to the trap. This has necessitated in each case a number of joints, each joint increasing the liability to leakage, and requiring special soft-metal bent sections adapted to the different forms of the trap to be connected. I overcome these objections by the use of the hard-metal connecting-pipe A, bent substantially as shown, and having a rib or flange, $a$, at one end and roughened at the other to facilitate soldering to the outlet-branch of the trap. The connection is secured with the hard-metal pipe—for instance, with the Y-branch $b$—by inserting the flanged end in the bell-mouth of the branch and filling the surrounding space with lead packing $e$, the other end being connected by solder $y$ to the branch of the trap.

Owing to the curved form of the connection, an S-trap or a P-trap may be united to the branch with like facility and with no alteration of any of the parts, it only being necessary to insert the connection as shown in Fig. 2 to unite properly with a P-trap, or as shown in Fig. 3 to unite with an S-trap.

The connection may be made of any suitable curves and sizes, and of brass or other metal capable of being united by soldering to the soft-metal traps.

Where it is necessary to make connections with air-pipes or with laterals leading to basins, tubs, &c., I provide the connecting-pipe A with one or more branches, $t\ t$, to which the pipes may be attached with little difficulty, thus avoiding the expense of perforating the traps.

I claim—

1. The connection for uniting hard and soft metal pipes, consisting of a curved tube, A, of hard metal, having a flange, $a$, at one end and adapted at the other to be united by soldering to the soft-metal pipe, substantially as set forth.

2. The flanged and curved hard-metal connecting-tube A, constructed as specified, and provided with branches $t$, for the purpose set forth.

In testimony whereof I have signed my name to this specification in the presence of two subscribing witnesses.

PATRICK KEILT.

Witnesses:
 WILLIAM MACKEY,
 WILLIAM RYAN.